(12) United States Patent
Murakami et al.

(10) Patent No.: US 7,157,820 B2
(45) Date of Patent: Jan. 2, 2007

(54) RESOLVER

(75) Inventors: Satoshi Murakami, Aichi-ken (JP); Daiki Suyama, Aichi-ken (JP); Masuho Sakakibara, Aichi-ken (JP); Kanji Kitazawa, Iida (JP); Hiromi Makiuchi, Iida (JP)

(73) Assignees: Aisin AW Co., Ltd, Aichi-ken (JP); Aismagama Seiki Co., Ltd., Nagano-Pref (JP)

( * ) Notice: Subject to any disclaimer, the term of this patent is extended or adjusted under 35 U.S.C. 154(b) by 0 days.

(21) Appl. No.: 11/190,809

(22) Filed: Jul. 28, 2005

(65) Prior Publication Data

US 2006/0043965 A1 Mar. 2, 2006

(30) Foreign Application Priority Data

Aug. 24, 2004 (JP) ............................. 2004-244154

(51) Int. Cl.
*H02K 1/12* (2006.01)
(52) U.S. Cl. .................... 310/68 B; 310/168; 310/216; 310/254
(58) Field of Classification Search ............. 310/68 B, 310/112, 168, 216, 254; 324/207.25
See application file for complete search history.

(56) References Cited

U.S. PATENT DOCUMENTS 4,672,347 A * 6/1987 Garcia et al. ............... 336/132
6,777,843 B1 * 8/2004 Hayashi et al. ............. 310/168
2003/0067233 A1 * 4/2003 Hayashi et al. ............... 310/90
2004/0070389 A1 4/2004 Kobayashi

FOREIGN PATENT DOCUMENTS

| JP | 09065617 A | * | 3/1997 |
| JP | 2001078393 A | * | 3/2001 |
| JP | 2004-69374 A | | 3/2004 |
| JP | 2005080430 A | * | 3/2005 |

* cited by examiner

Primary Examiner—Darren Schuberg
Assistant Examiner—David W. Scheuermann
(74) Attorney, Agent, or Firm—Sughrue Mion, PLLC (57) ABSTRACT

Plurality of air gaps are formed in a torus-shaped stator body of the resolver. If a straight line were drawn from a center point of the stator body toward the outside in the radial direction of the stator body and the straight line were rotated 360 degrees about the center point, the straight line would intersect with at least one of an inside air gap and an outside air gap. Therefore, magnetic flux (i.e., noise caused by magnetism) that has penetrated from the outer peripheral surface side of the stator body will always pass through a portion of the stator body that is to the outside in the radial direction of the air gaps, such that a large portion of the magnetic flux is eliminated by the air gaps.

19 Claims, 6 Drawing Sheets

--- MAGNETIC FLUX

FIG. 5

--- MAGNETIC FLUX

--- MAGNETIC FLUX

(b)

--- MAGNETIC FLUX

FIG. 8

MAGNETIC NOISE PENETRATING TO THE TEETH

RESOLVER

CROSS-REFERENCE TO RELATED APPLICATIONS

This application claims the priority of Japanese Patent Application No. JP 2004-244154, filed Aug. 24, 2004 in the Japanese Patent Office, the entire disclosure of which is incorporated herein by reference.

BACKGROUND OF THE INVENTION

1. Field of the Invention

The present invention relates to a resolver which detects the rotational position of a motor.

2. Description of the Related Art

Figure 10:
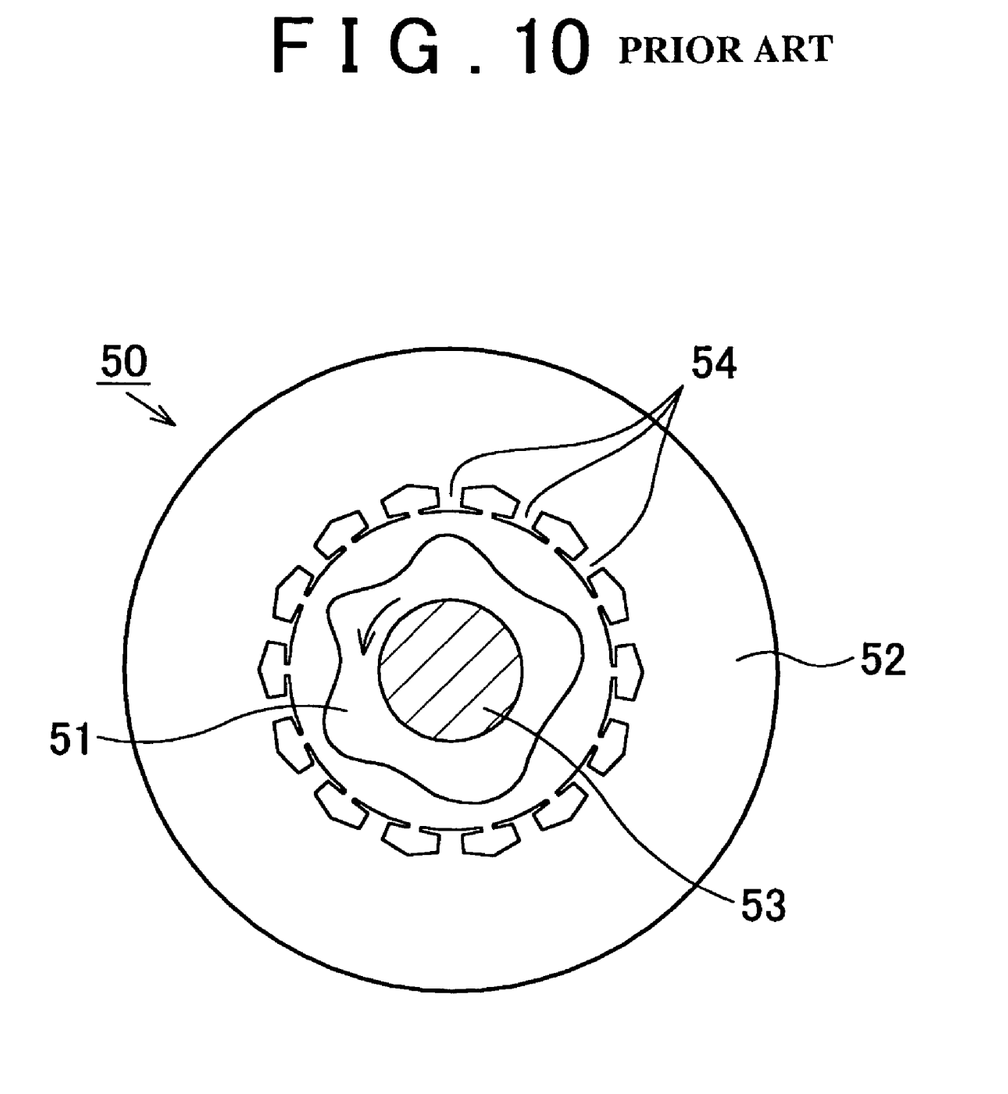
FIG. 10 is a view of the structure of a resolver stator of related art.

In the past, a variable reluctance resolver (hereinafter, simply referred to as "resolver"), such as that disclosed in Japanese Patent Application Laid Open No. 2004-69374, has been proposed as a detection sensor which detects the rotational position of a rotating electrical machine such as an electric motor (i.e., a motor) or a generator. As shown in FIG. 10, a resolver 50 includes a resolver rotor (i.e., a rotor) 51 and a resolver stator (i.e., a stator) 52. The resolver rotor 51 is provided so as to rotate together with a drive shaft 53 that extends from a motor, not shown.

The resolver stator 52 is torus-shaped and surrounds the resolver rotor 51 from the outside. A plurality of teeth 54 are formed at equidistant intervals in the circumferential direction on the inner peripheral surface side of the resolver stator 52. Also, an exciting coil, a first output coil, and a second output coil, not shown, are wound around (the teeth 54 of) the resolver stator 52. The first output coil and the second output coil are such that the phases of the output signals (alternating current signals) detected by a control apparatus, not shown, are offset by 90 degrees.

When a reference signal (i.e., voltage) is output to the exciting coil of the resolver 50 in order to detect the rotational position of the motor, a gap width between the resolver rotor 51 and the resolver stator 52 changes such that the first output coil and second output coil each generate an output signal according to the gap width. The control apparatus then calculates the rotational position of a rotating portion (such as a rotor core) of the motor based on the output signals from the first output coil and second output coil, which correspond to the position of the resolver rotor 51.

The resolver 50 disclosed in Japanese Patent Application Laid Open No. 2004-69374 is arranged in a position close to the motor, i.e., resolver 50 is located adjacent to a portion (also referred to as the "coil end") of the exciting coil of the motor, in order to make the entire motor, including the resolver 50, more compact. As a consequence of the proximity of the resolver 50 to the exciting coil, some of the magnetic flux generated by the exciting coil becomes noise to the resolver 50 when an exciting current is supplied to the exciting coil of the motor. Thus, noise (i.e., voltage) generated from the electromagnetic induction action of the noise resulting from this magnetism may ride on the output signals of the first output coil and the second output coil, and a reference signal sent to the exciting coil of the resolver stator 52. If this happens, the wave shape of the output signals may become distorted. As a result of this distortion, the rotational position of the rotating portion (i.e., the rotor core) of the motor may no longer be able to be accurately detected.

Also, an inverter, not shown, for supplying electric current to the motor and resolver 50 and the like, is provided near the resolver 50. In this case, noise (i.e., voltage) generated by the electromagnetic induction action resulting from the switching operation in the inverter may ride on the output signals and the reference signal. Therefore, in this case as well, noise generated from the electromagnetic induction action of the noise resulting from the magnetism generated by the inverter and the exciting coil of the motor and the like may ride on the output signals, thereby distorting the wave shapes of those signals. As a result, the rotational position of the rotating portion (i.e., the rotor core) of the motor is no longer able to be accurately detected, just as described above.

SUMMARY OF THE INVENTION

An aspect of an exemplary embodiment of the present invention thus provides a resolver which is able to suppress distortion of the wave shape of an output signal, which occurs due to the influence of noise resulting from magnetism from sources which may interfere with the resolver.

According to another aspect of an exemplary embodiment of the present invention, distortion of the wave shape of an output signal, which occurs due to the influence of noise resulting from magnetism from sources which may interfere with the resolver, is able to be suppressed.

BRIEF DESCRIPTION OF THE DRAWINGS

These and other aspects of exemplary embodiments of the present invention will become better understood with reference to the following description and accompanying drawings, which should not be read to limit the invention in any way, in which.

DETAILED DESCRIPTION OF THE EXEMPLARY EMBODIMENTS

Hereinafter, a first exemplary embodiment will be described with reference to FIGS. 1 to 6, in which a variable reluctance resolver (hereinafter, simply referred to as "resolver") detects a rotational position of a motor/generator (i.e., a rotating electrical machine) in a hybrid vehicle drive system.

Figure 1:
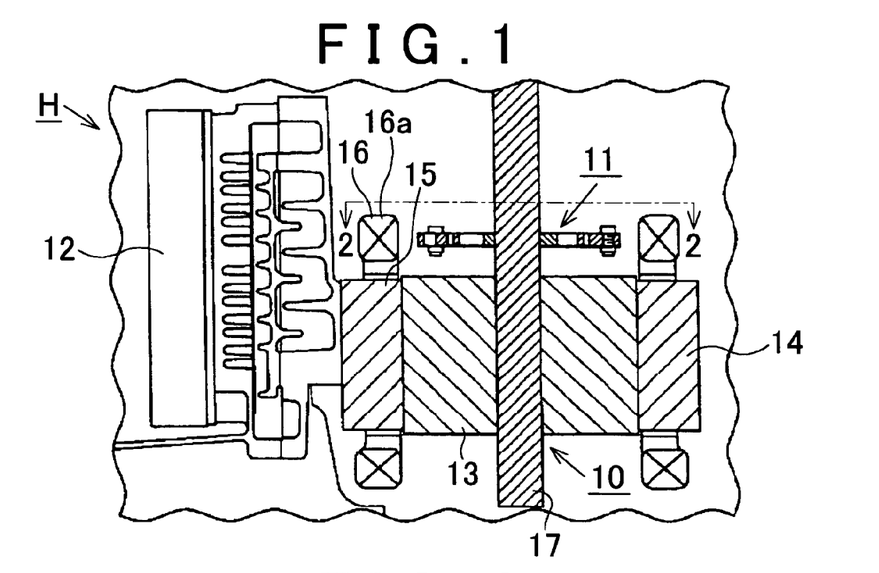
FIG. 1 is a sectional view schematically illustrating a portion of a hybrid vehicle drive system.

As shown in the sectional view of a portion of a drive system in FIG. 1, a hybrid vehicle drive system H of this exemplary embodiment includes a motor (more specifically, a motor/generator) 10, a resolver 11 for detecting the rotational position of the motor 10, and an inverter 12 for supplying power to the motor 10. The motor 10 has three functions, i.e., i) it generates driving force for starting an engine (i.e., an internal combustion engine), not shown, ii) it generates driving force for driving a vehicle, and iii) it generates power from the driving force of the driving engine. Also, the inverter 12 has two functions, i.e., i) it supplies power to the motor 10 from a battery, not shown, and ii) it charges the battery with power generated by the motor 10.

Figure 2:
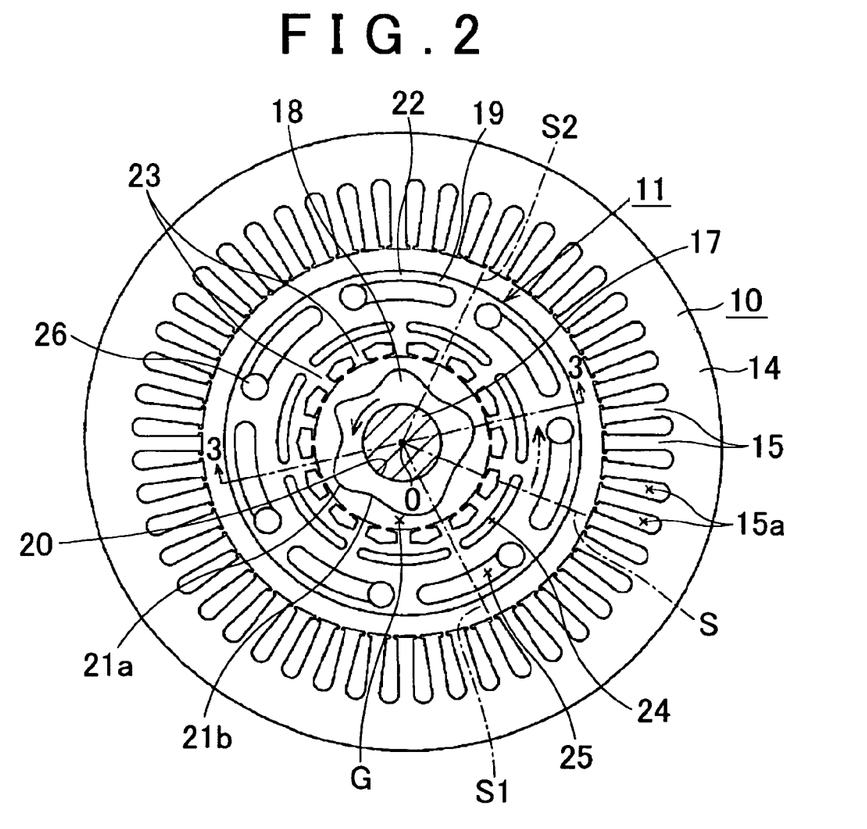
FIG. 2 is a perspective view taken along line 2—2 in FIG. 1.

The motor 10 includes a cylindrical rotor core 13 and a torus-shaped stator core 14 that is arranged so as to surround the outer peripheral surface of the rotor core 13 across a gap, not shown. A plurality of teeth 15 are formed at equidistant intervals in the circumferential direction on the inner peripheral surface side of the stator core 14, as shown in FIG. 2. An exciting coil 16, not shown in FIG. 2, is wound around the teeth 15. Incidentally, the exciting coil 16 that is wound around the teeth 15 is distinguished from a coil end 16a, which is a non-inserted portion and an inserted portion, not shown, which is arranged within slots 15a formed between the teeth 15. Also, a drive shaft 17, which extends through the rotor core 13 is fixed to the rotor core 13 in a position corresponding to the central axis of the stator core 14, such that the drive shaft 17 and the rotor core 13 rotate together as a single unit.

Further, the inverter 12 is arranged in a position near a part of the outer peripheral surface of the stator core 14 of the motor 10 (i.e., a position adjacent to the left side surface of the stator core 14 in FIG. 1). A plurality of electronic devices such as transistors, not shown, and the like are provided inside the inverter 12. The inverter 12 converts direct current to alternating current and converts alternating current to direct current by high-speed switching operations of the transistor and the like.

Figure 3:
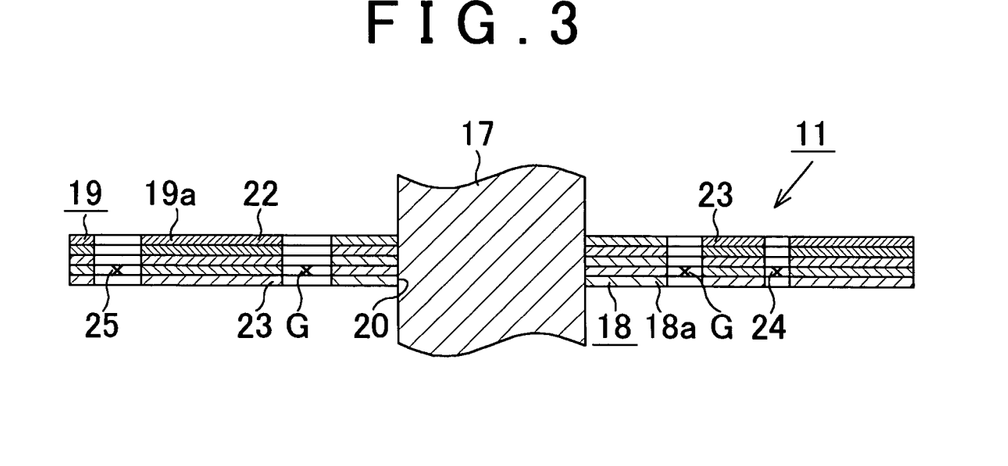
FIG. 3 is a perspective sectional view taken along line 3—3 in FIG. 2.

Next, the specific structure of the resolver 11 according to this exemplary embodiment will be described in detail with reference to FIGS. 2 and 3. In FIG. 3, the length in the axial direction of the resolver 11 (i.e., the length in the vertical direction in FIG. 3) is shown exaggerated with respect to the length in the radial direction of the resolver 11 (i.e., the length in the left-right direction in FIG. 3) to facilitate understanding.

As shown in FIGS. 2 and 3, the resolver 11 in this exemplary embodiment includes a resolver rotor (i.e., a rotor) 18 and a toric resolver stator (i.e., a stator) 19. The resolver stator 19 is arranged so as to surround the resolver rotor 18 from the outside across a gap G. The resolver rotor 18 is formed by stacking together a plurality (only five are shown in this exemplary embodiment) of rotor steel sheets 18a of high magnetic permeability material (such as silicon steel). Each of the rotor steel sheets 18a has a through-hole 20 which is formed substantially in its center, and is formed in a deformed polygon shape (a deformed pentagon shape in this exemplary embodiment) in which convex portions 21a and concave portions 21b are formed alternately on the outer edge portion. The drive shaft 17 is then fixedly fitted in the through-hole 20 of the resolver rotor 18, which is formed of the rotor steel sheets 18a that are stacked and fixed in this state.

The resolver stator 19 includes a toric stator body 22 that is formed by stacking together a plurality (only five are shown in this exemplary embodiment) of stator steel sheets 19a. A plurality (14 in this exemplary embodiment) of teeth 23 are formed on the stator body 22 at equidistant intervals in the circumferential direction of the stator body 22, such that they protrude from the inner peripheral surface side of the stator body 22 toward the inside in the radial direction of the stator body 22. Although not shown, a plurality of coils (i.e., an exciting coil, a first output coil, and a second output coil) are wound around the teeth 23. When voltage is output to the exciting coil and the resolver rotor 18 rotates, the gap width between the outer peripheral surface side of the resolver rotor 18 and the inner peripheral surface side of the resolver stator 19 changes so the resolver rotor 18 changes the reluctance (i.e., magnetic resistance). As a result, the output coils each output signals corresponding to the gap width (i.e., the reluctance). As output signals, a sine wave is output from the first output coil and a cosine wave in which the phase is offset by 90 degrees with respect to the sine wave is output from the second output coil.

Also, a plurality of air gaps 24 and 25 are formed in the stator body 22 that extend through the stator body 22 in the axial direction. The air gaps 24 are long holes which form minor arcs that extend in the circumferential direction of the stator body 22, and are formed adjacent to one another, at equidistant intervals, in the circumferential direction of the stator body 22. The air gaps 25 are also long holes which form minor arcs that extend in the circumferential direction of the stator body 22. Further, air gaps 24 are formed adjacent to one another, at equidistant intervals, in the circumferential direction of the stator body 22 in positions radially outward from the air gaps 24. A bolt (i.e., a fastening device) 26 for fastening the stator steel sheets 19a in a stacked state is inserted through a portion of each air gap 25 in the stacking direction of the stator steel sheets 19a. Therefore, the air gaps 25 are formed wider in the radial direction than the air gaps 24 which are formed in positions radially inward from the air gaps 25 in the stator body 22. In the following description, the air gaps 24 formed in positions to the inside in the radial direction of the stator body 22 will also be referred to as "inside air gaps", and the air gaps 25 formed in positions to the outside in the radial direction of the stator body 22 will also be referred to as "outside air gaps".

In this exemplary embodiment, if an imaginary straight line S1 is drawn which passes through a center point O of the stator body 22 and between two inside air gaps 24 that are adjacent to each other in the circumferential direction of the stator body 22, the straight line S1 intersects with an outside air gap 25, which is a long hole, near the middle between both of its end portions. Also, if an imaginary straight line S2 is drawn which passes through the center point O of the stator body 22 and between two outside air gaps 25 that are adjacent to each other in the circumferential direction of the stator body 22, the straight line S2 intersects with an inside air gap 24, which is a long hole, near the middle between both of its end portions. Therefore, if an imaginary straight line S is drawn from the center point O of the stator body 22 toward the outside in the radial direction of the stator body 22 and that straight line S is rotated 360 degrees about the center point O, the straight line S would always intersect with at least one of the inside air gap 24 and the outside air gap 25 throughout the entire 360 degrees.

Also, the distance in the circumferential direction between inside air gaps 24 that are adjacent to each other in the circumferential direction of the stator body 22 is the shortest possible distance that will still allow the resolver 11 (i.e., the resolver stator 19) to sufficiently display its function, as long as it is enough to tolerate vibrations from the driving of the motor 10 and the engine. Therefore, the length in the circumferential direction of each inside air gap 24 itself is as long as possible in the circumferential direction of the stator body 22. Similarly, the length in the circumferential direction of each outside air gap 25 itself is the longest possible length in the circumferential direction of the stator body 22 that will allow the resolver 11 (i.e., the resolver stator 19) to sufficiently display its function. Accordingly, if the straight line S is rotated about the center point O, the straight line S would intersect with both the inside air gaps 24 and the outside air gaps 25 at more locations (angular positions).

The resolver 11 according to this exemplary embodiment is arranged such that the resolver stator 19 is adjacent to the coil end 16a of the exciting coil 16 of the motor 10 since the resolver rotor 18 is fixed to the drive shaft 17 (see FIG. 1). More specifically, the resolver 11 is arranged further to the inside in the radial direction than the coil end 16a of the motor 10 in order to make the motor 10 and the resolver 11 compact (i.e., in order to have the motor 10 and the resolver 11 be closer together). Therefore, when electric current is passed through the exciting coil 16 of the motor 10, some of the magnetic flux (also referred to as "magnetism") which is induced from the exciting coil 16 may become noise as a result of the magnetism and penetrate from the outer peripheral surface side of the resolver stator 19 (i.e., the stator body 22) toward the teeth 23 which are formed on the inner peripheral surface side of the resolver stator 19 (i.e., the stator body 22). Also, the inverter 12 is arranged in a position near the resolver 11 in the hybrid vehicle drive system H of this exemplary embodiment. The inverter 12 performs switching operations of transistors and the like provided inside the inverter 12, and noise is also generated from these switching operations. The noise from the switching also penetrates the resolver stator 19 from the outer peripheral surface side of the stator body 22 toward the teeth 23 formed on the inner peripheral surface side of the stator body 22. The resolver 11 can thus ensure the original detection function by suppressing the penetration of this kind of noise.

Figure 4:
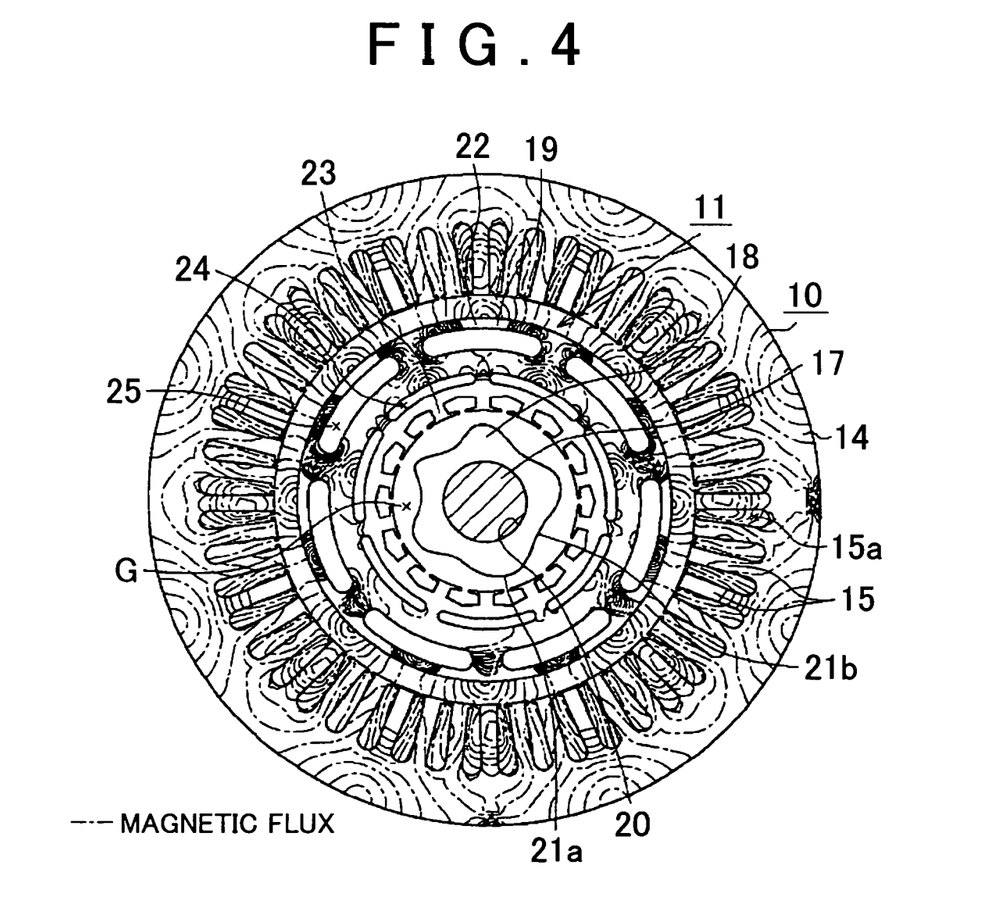
FIG. 4 is a view illustrating the manner in which magnetic flux penetrates a resolver stator according to one exemplary embodiment of the present invention.
Figure 5:
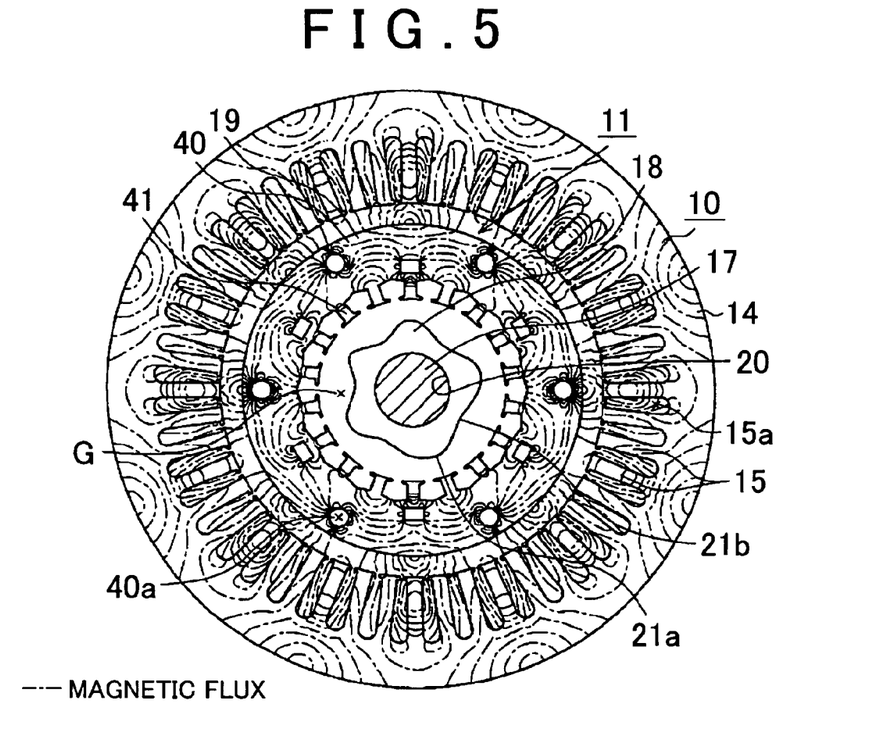
FIG. 5 is a view illustrating the manner in which magnetic flux penetrates a resolver stator according to a comparative example.

Next, a function carried out by the plurality (seven in this exemplary embodiment) of inside air gaps 24 and the plurality (seven in this exemplary embodiment) of outside air gaps 25 formed on the resolver stator 19 (i.e., the stator body 22) according to this exemplary embodiment to suppress the penetration of noise resulting from the magnetism in a situation such as that described above will be described with reference to FIGS. 4 to 6. In FIGS. 4 and 5, the bolts 26 are not shown in order to facilitate understanding of the description. In the following description, the "noise resulting from magnetism" may also be referred to as "magnetic flux".

When electric current flows through the exciting coil 16 of the motor 10, as shown in FIG. 4, magnetic flux (indicated by the alternate long and short dash lines) from the exciting coil 16 and the inverter 12 penetrates the stator body 22 from the outer peripheral surface side thereof toward the inner peripheral surface side thereof. The outside air gaps 25 prevent some of that magnetic flux from penetrating farther to the inside in the radial direction than the positions in the radial direction where the outside air gaps 25 are formed. That is, the magnetic flux passes smoothly through the portion of the stator body 22 that is to the outside in the radial direction (through which magnetic flux can easily pass) of the outside air gaps 25 which have air in them, and as a result, does not easily penetrate the portion of the stator body 22 that is to the inside in the radial direction of the outside air gaps 25. In this case, the air in the outside air gaps 25 acts as magnetic resistance which makes it difficult for the magnetic flux to penetrate farther to the inside in the radial direction than the outside air gaps 25.

Further, of the magnetic flux that penetrates from the outer peripheral surface side of the stator body 22, the magnetic flux that passes between the outside air gaps 25 and penetrates still further to the inside in the radial direction passes smoothly through the portion of the stator body 22 that is to the outside in the radial direction (through which magnetic flux can easily pass) of the inside air gaps 24 which have air in them. As a result of the air in outside air gaps 25, magnetic flux does not easily penetrate the portion of the stator body 22 that is to the inside in the radial direction of the inside air gaps 24. Also, similar to the outside air gaps 25, the air in the inside air gaps 24 acts as magnetic resistance. Of the air gaps (i.e., the plurality of types of magnetic flux blocking portions) 24 and 25, the inside air gaps (one type of magnetic flux blocking portion) 24 are arranged such that, when the straight line S and a center portion between both end portions in the circumferential direction of one of the inside air gaps 24 intersect, the straight line S passes between two outside air gaps (the other type of magnetic flux blocking portion) 25 that are adjacent to each other in the circumferential direction and formed to the outside in the radial direction of that inside air gap 24. Therefore, the inside air gaps 24 make it more difficult for magnetic flux that has penetrated to the inside in the radial direction of the outside air gaps 25 to penetrate farther to the inside in the radial direction than the inside air gaps 24. Accordingly, in this exemplary embodiment, the inside air gaps 24 and the outside air gaps 25 act as magnetic flux blocking portions which stop magnetic flux from penetrating from the outer peripheral surface (i.e., the peripheral surface on which the teeth 23 are not formed) side of the stator body 22 toward the teeth 23 on the inner peripheral surface side.

On the other hand, air gaps or the like which act as magnetic flux blocking portions are not formed in a stator body 40 of a comparative example shown in FIG. 5. Incidentally, bolt insertion holes 40a, through which bolts 26 (not shown in FIG. 5) are inserted, are formed in the stator body 40. As a result, a large portion of the magnetic flux that has penetrated from the outer peripheral surface side of the stator body 40 toward teeth 41 on the inner peripheral surface side penetrates up to the teeth 41, as shown in FIG. 5. The magnetic flux that has penetrated up to the teeth 41 generates voltage (so-called noise) by the electromagnetic induction action on the various coils (i.e., the exciting coil, the first output coil, and the second output coil), not shown, which are wound around the teeth 41. In this way, the voltage generated in the various coils by the magnetic flux distorts the reference signal (i.e., voltage) of the exciting coil and the output signals (i.e., voltage) output from the output coils.

Figure 6:
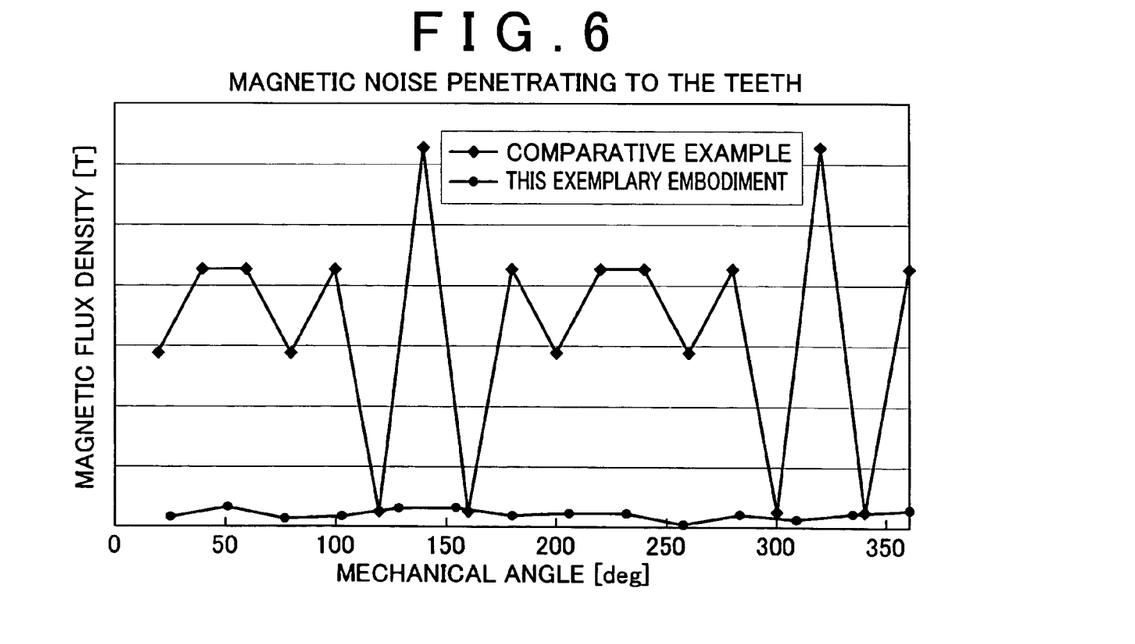
FIG. 6 is a chart comparing the magnetic flux density at teeth formed on the resolver stator according to this exemplary embodiment with the magnetic flux density at teeth formed on the resolver stator according to the comparative example.

Further, a comparative chart is shown in FIG. 6 that compares the magnetic flux density analyzed at the teeth 23 which is formed on the stator body 22 of this exemplary embodiment with the magnetic flux density analyzed at the teeth 41 which is formed on the stator body 40 of the comparative example. Incidentally, the horizontal axis represents the mechanical angle (360 degrees with one rotation of the resolver stator 18) of rotation of the resolver stator 18, with [deg] being the abbreviation for [degree (°)] which is the unit of rotational angle. Also, the vertical axis represents the magnetic density entering one tooth, with [T] being the abbreviation for [Tesla] which is the unit of magnetic density.

First, in the stator body 40 of the comparative example, a high density magnetic flux penetrates to the teeth 41, as is evident in FIG. 5. Therefore, when the resolver rotor 18 rotates once, an extremely strong magnetic flux density is analyzed at the teeth 41. On the other hand, with the stator body 22 of this exemplary embodiment, the magnetic flux that has penetrated from the outside is stopped by the air gaps 24 and 25, as is evident in FIG. 4. Thus, the magnetic flux from the outside does not penetrate to the teeth 23. Therefore, even when the resolver rotor 18 rotates once, only an extremely weak magnetic flux density (almost "0 (zero) Tesla") is analyzed at the teeth 23. Accordingly, in this exemplary embodiment, the output signals are virtually unaffected by the magnetic flux and distortion of the wave shapes of the output signals that are detected by the resolver 11 is able to be suppressed.

Accordingly, this exemplary embodiment enables the following effects to be obtained.

(1) A plurality of air gaps 24 and 25 which serve as magnetic flux blocking portions are formed on the toric stator body 22. When a straight line S is drawn from a center point O of the stator body 22 toward the outside in the radial direction of the stator body 22 and that straight line S is rotated 360 degrees about that center point O, the straight line S intersects with either the inside air gap 24 or the outside air gap 25, or both. Therefore, the magnetic flux that has penetrated from the outer peripheral surface side of the stator body 22 passes through the portion of the stator body 22 that is to the outside, in the radial direction, of the air gaps 24 and 25, such that a large portion of that magnetic flux is stopped by the air gaps 24 and 25. That is, the stator body 22 is structured so that magnetic flux that penetrates from the outer peripheral surface side of the stator body 22 toward the teeth 23 on the inner peripheral surface side is unable to easily penetrate up to the teeth 23, such that the magnetic flux density that is analyzed at the teeth 23 has an extremely low value. Accordingly, distortion of the wave shapes of the output signals output from the output coils, which occurs due to the effect of noise resulting from magnetism from the outside, is able to be suppressed.

(2) The air gaps (magnetic flux blocking portions) 24 and 25 are formed by punching out long holes that extend in the circumferential direction of the torus-shaped stator steel sheets 19*a* at the same time that the steel sheets 19*a* are punch-formed, and stacking the stator steel sheets 19*a* together. It is therefore possible to avoid increasing the number of manufacturing processes, which would otherwise be required if a separate process were to be used to form the air gaps 24 and 25 in the stator body 22. It is also possible to avoid increasing manufacturing costs which would occur if, for example, a separate member were to be added to the stator body 22 to serve as the magnetic flux blocking portion.

(3) A bolt (i.e., a fastening device) 26 for fastening and fixing the stator steel sheets 19*a* that form the resolver stator (i.e., the stator) 19 together is inserted, in the stacking direction of the stator steel sheets 19*a*, into one end portion (one portion) of the two end portions in the lengthwise direction of each outside air gap 25. That is, the outside air gaps 25 also serve as bolt through-holes for inserting bolts 26. Accordingly, it is possible to avoid complicating the structure of the resolver stator 19, which would otherwise occur if bolt through-holes were to be formed in addition to the air holes 24 and 25. Also, since it is possible to suppress an increase in the number of locations at which holes (including the air gaps 24 and 25) are formed in the stator steel sheets 19*a*, it is therefore possible to suppress the stator steel sheets 19*a* from bending and deforming when punching out the holes.

(4) The air in the air gaps 24 and 25 acts as magnetic resistance, which makes it possible to suppress magnetic flux that has penetrated from the outer peripheral surface side of the stator body 22 toward the inside in the radial direction from penetrating farther to the inside in the radial direction than the positions where the air gaps 24 and 25 are formed.

(5) Both the inside air gaps 24, which are formed adjacent to one another in the circumferential direction of the stator body 22, and the outside air gaps 25, which are formed similarly in the circumferential direction in positions farther to the outside, in the radial direction, of the stator body 22 than the inside air gaps 24, are formed so that the circumferential lengths of the air gaps 24 and 25 are as long as possible in the circumferential direction of the stator body 22. Therefore, if the straight line S is rotated 360 degrees about the center point O of the stator body 22, that straight line S will intersect with both the inside air gap 24 and the outside air gap 25 at more locations (angular positions). That is, when the center point O is the reference, there are a large number of locations where twice the number of magnetic flux blocking portions are formed. As a result, it is possible to better suppress magnetic flux that has penetrated from the outer peripheral surface side of the stator body 22 toward the teeth 23 formed on the inner peripheral surface side from passing between the outside air gaps 25 and inside air gaps 24 and reaching the teeth 23.

(6) The inside air gaps (one type of magnetic flux blocking portion) 24 are arranged such that the circumferential positions of the center portions between both end portions in the circumferential direction match the circumferential positions between two outside air gaps (another type of magnetic flux blocking portion) 25 that are adjacent to one another in the circumferential direction and formed farther to the outside, in the radial direction, than the inside air gaps 24. That is, by having the portions between inside air gaps 24 that are adjacent in the circumferential direction and the portions between outside air gaps 25 that are adjacent in the circumferential direction arranged so that they are as far apart as possible from each other, it is possible to make it difficult for magnetic flux that has penetrated the stator body 22 from the outer peripheral surface side to penetrate to the inside in the radial direction.

The exemplary embodiment may also be modified to other exemplary embodiments (i.e., other examples) as follows.

In the foregoing exemplary embodiment, magnetic flux blocking portions may be formed by forming through-holes in the axial direction of the stator body 22 and inserting appropriate material (such as stainless steel), which has a magnetic permeability that is lower than the magnetic permeability of the material of which the stator body 22 is made of, in the through-holes. That is, instead of the air gaps 24 and 25, which are filled with air, of the foregoing exemplary embodiment, magnetic flux blocking portions may be formed by inserting the low magnetic permeability material into the through-holes that are formed through the stator body 22.

In the foregoing exemplary embodiment, the stator body 22 may be a structure in which special bolt insertion holes, through which the bolts 26 are inserted to fasten and fix the stator steel sheets 19*a* together in a stacked state, are formed separately from the outside air gaps 25.

In the foregoing exemplary embodiment, the stator body 22 may be a structure in which not only two types of air gaps (i.e., the inside air gaps 24 and the outside air gaps 25) are formed at different distances in the radial direction from the center point O of the stator body 22, but three or more types of air gaps may be formed.

In the foregoing exemplary embodiment, when an imaginary straight line is drawn which passes through the center point O of the stator body 22 and between inside air gaps 24 that are adjacent to one another in the circumferential direction of the stator body 22, the straight line does not have to intersect with an outside air gap 25 near the middle between both end portions thereof. That is, the positional relationship of the inside air gaps 24 and the outside air gaps 25 is not particularly limited as long as the straight line S intersects with at least one of the inside air gaps 24 and the outside air gaps 25 when the straight line S rotates 360 degrees about the center point O.

Figure 7:
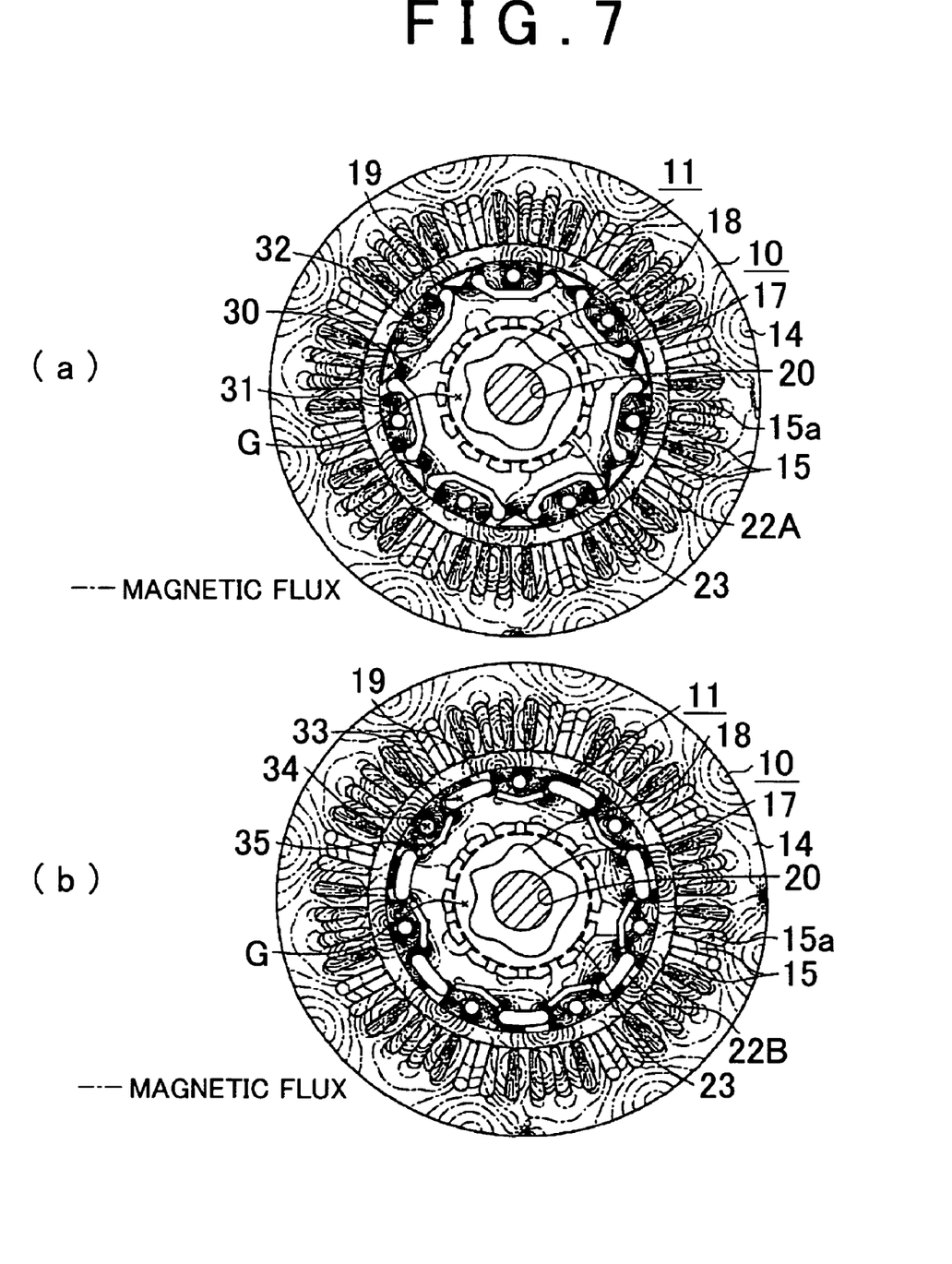
FIG. 7(a) is a view illustrating the manner in which magnetic flux penetrates a resolver stator according to another example.
FIG. 7(b) is a view illustrating the manner in which magnetic flux penetrates a resolver stator according to yet another example.

In the foregoing exemplary embodiment, the stator body 22 of the resolver stator 19 in which the air gaps (magnetic flux blocking portions) are formed may also be a stator body in which are formed air gaps having shapes such as those shown in FIGS. 7(*a*) and (*b*). That is, with a stator body 22A shown in FIG. 7(*a*), air gaps 30 are formed which are shaped like long holes that extend in the circumferential direction of the stator body 22A, with both end portions in the lengthwise direction pointing toward the outside in the radial direction of the stator body 22A. Further, generally triangular air gaps (hereinafter, referred to as "triangular air gaps") 31 are formed in positions between the air gaps 30 that are adjacent to one another in the circumferential direction of the stator body 22A. Also, bolt insertion holes 32 for inserting bolts 26 (not shown in FIG. 7(*a*)) are formed in the stator body 22A in positions to the outside in the radial direction of the air gaps 30.

Figure 8:
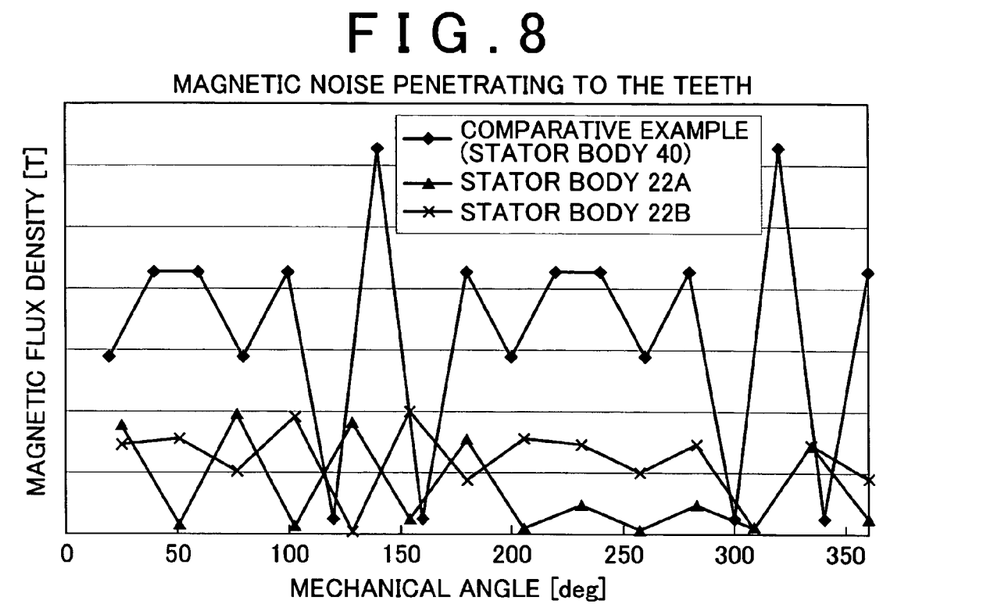
FIG. 8 is a chart comparing the magnetic flux density at the teeth formed on the resolver stator of the comparative example with the magnetic flux densities at the teeth formed on the resolver stators of the examples illustrated in FIGS. 7(a) and (b)

By forming the air gaps 30 and 31 in the stator body 22A in this manner, if a straight line were drawn from the center point of the stator body 22A toward the outside in the radial direction and that straight line were rotated 360 degrees about the center point, the straight line would intersect with at least one of the air gaps 30 and the triangular air gaps 31. Therefore, a large portion of the magnetic flux that penetrates from the outer peripheral surface side of the stator body 22A toward the inner peripheral surface side is able to be stopped by the air gaps 30 and 31 in the stator body 22A. Accordingly, compared with the stator body 40 of the comparative example, the stator body 22A is able to reduce the magnetic flux density analyzed at the teeth 23, as shown in FIG. 8.

Further, with a stator body 22B shown in FIG. 7(*b*), long hole-shaped air gaps 33 that extend in the circumferential direction of the stator body 22B are formed adjacent to one another in the circumferential direction of the stator body 22B, while bolt insertion holes 34 are formed in between the air gaps 33. Also, long hole-shaped air gaps 35, which extend in the circumferential direction of the stator body 22B, are formed in positions farther to the inside in the radial direction of the stator body 22B than the bolt insertion holes 34 in the stator body 22B. Both end portions, in the lengthwise direction, of the air gaps 35 are pointed to the outside in the radial direction of the stator body 22B. The bolts 26 are not shown in FIG. 7(*b*).

By forming the air gaps 33 and 35 in this manner, if a straight line were drawn from the center point of the stator body 22B toward the outside in the radial direction and that straight line were rotated 360 degrees about the center point, the straight line would intersect with at least one of the air gaps 33 and the air gaps 35. Therefore, a large portion of the magnetic flux that penetrates from the outer peripheral surface side of the stator body 22B toward the inner peripheral surface side is eliminated by the air gaps 33 and 35 in the stator body 22B. Accordingly, compared with the stator body 40 of the comparative example, the stator body 22B is able to reduce the magnetic flux density analyzed at the teeth 23, as shown in FIG. 8.

Figure 9:
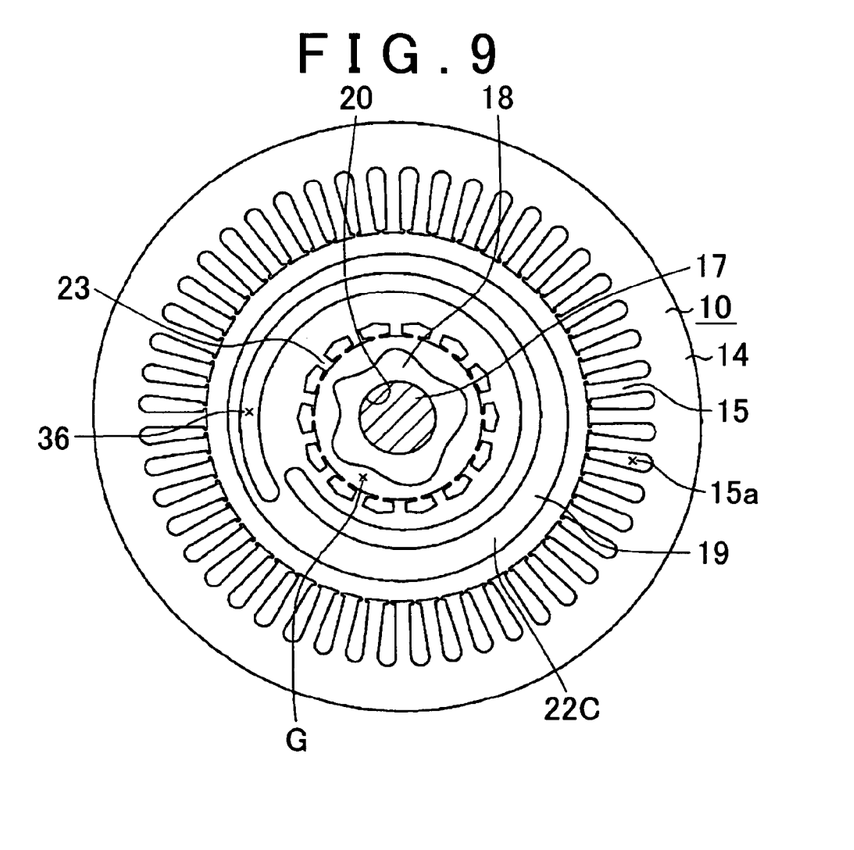
FIG. 9 is a view of the structure of a resolver stator of still another example.

In the foregoing exemplary embodiment, the air gap (i.e., magnetic flux blocking portion) is not particularly limited in terms of its shape as long as it is shaped so that, if a straight line drawn from the center point O of the stator body 22 toward the outside in the radial direction were rotated 360 degrees about the center point O, the straight line would always intersect with the air gap. For example, the air gap may be shaped like a spiral-shaped air gap 36 formed in a stator body 22C shown in FIG. 9. With this air gap 36, none of the original function of the resolver 11 is lost due to vibrations or the like generated by driving of the motor 10 or the engine or the like.

In the foregoing exemplary embodiment, the resolver stator 19 may also be of a structure in which the plurality of teeth 23 are formed protruding from the outer peripheral surface of the stator body 22 toward the outside in the radial direction. In this case, the resolver rotor 18 is preferably annular and positioned so that it surrounds the outer peripheral surface of the resolver stator 19.

In addition, the resolver according to the first or fifth aspect is such that the magnetic flux blocking portions are structured with low magnetic permeability material inserted in through-holes that are formed in the axial direction through the stator body.

Although exemplary embodiments of the present invention have been described, it will be understood by one of skill in the art that the present invention is not limited to the described embodiments, but can be variously modified within the spirit and scope of the invention.

What is claimed is:

1. A resolver comprising:
   a stator comprising an annular stator body and a plurality of teeth which are formed on the stator, wherein the plurality of teeth protrude from a peripheral surface of the annular stator body; and
   a rotor which rotates so as to change a reluctance between the rotor and the peripheral surface of the annular stator body on which the plurality of teeth protrude, wherein the rotation of the rotor causes the stator to produce an electromagnetic induction action,
   wherein a magnetic flux blocking portion for blocking magnetic flux that penetrates toward the teeth from a peripheral surface side of the annular stator body on which the plurality of teeth do not protrude is formed on the annular stator body, the magnetic flux blocking portion being formed in a position in which, if a straight line were drawn from a center point of the annular stator body toward the outside in the radial direction and the straight line were rotated 360 degrees about the center point, the straight line would intersect with the magnetic flux blocking portion at every angle.

2. The resolver according to claim 1, wherein the plurality of teeth protrude from an inner peripheral surface of the annular stator body toward the inside in the radial direction, and the magnetic flux blocking portion is formed so as to block magnetic flux that penetrates from an outer peripheral surface side of the stator body toward the teeth on the inner peripheral surface side.

3. The resolver according to claim 2, wherein the magnetic flux blocking portion is an air gap which is formed in the axial direction through the stator body.

4. The resolver according to claim 3, wherein the stator body comprises a plurality of stator steel sheets and a fastening device that fastens and fixes the stator steel sheets together in a stacked state, the fastening device being inserted through one portion of the air gap in the stacking direction of the stator steel sheets.

5. The resolver according to claim 3, wherein the magnetic flux blocking portion comprises a plurality of types of magnetic flux blocking portions which are formed in a shape of long holes which extend in the circumferential direction of the annular stator body, and which are at different distances in the radial direction from the center point of the annular stator body.

6. The resolver according to claim 5, wherein a first type of magnetic flux blocking portion, from among the plurality of types of magnetic flux blocking portions, is arranged such that, when the straight line intersects with the first type of magnetic flux blocking portion, the straight line passes between two of another type of magnetic flux blocking portions which are formed farther to the outside in the radial direction than the first type of magnetic flux blocking portion and which are adjacent to each other in the circumferential direction.

7. The resolver according to claim 5, wherein a first type of magnetic flux blocking portion, from among the plurality of types of magnetic flux blocking portions, is arranged such that, a circumferential position of a center portion in the circumferential direction of the first type of magnetic flux blocking portion matches a circumferential position between two of another type of magnetic flux blocking portions that are adjacent to one another in the circumferential direction.

8. The resolver according to claim 2, wherein the magnetic flux blocking portion comprises a plurality of types of magnetic flux blocking portions which are formed in a shape of long holes which extend in the circumferential direction of the annular stator body, and which are at different distances in the radial direction from the center point of the annular stator body.

9. The resolver according to claim 8, wherein a first type of magnetic flux blocking portion, from among the plurality of types of magnetic flux blocking portions, is arranged such that, when the straight line intersects with the first type of magnetic flux blocking portion, the straight line passes between two of another type of magnetic flux blocking portions which are formed farther to the outside in the radial direction than the first type of magnetic flux blocking portion and which are adjacent to each other in the circumferential direction.

10. The resolver according to claim 8, wherein a first type of magnetic flux blocking portion, from among the plurality of types of magnetic flux blocking portions, is arranged such that, a circumferential position of a center portion in the circumferential direction of the first type of magnetic flux blocking portion matches a circumferential position between two of another type of magnetic flux blocking portions that are adjacent to one another in the circumferential direction.

11. The resolver according to claim 1, wherein the magnetic flux blocking portion is an air gap which is formed in the axial direction through the annular stator body.

12. The resolver according to claim 11, wherein the stator body comprises a plurality of stator steel sheets and a fastening device that fastens and fixes the stator steel sheets together in a stacked state, the fastening device being inserted through one portion of the air gap in the stacking direction of the stator steel sheets.

13. The resolver according to claim 11, wherein the magnetic flux blocking portion comprises a plurality of types of magnetic flux blocking portions which are formed in a shape of long holes which extend in the circumferential direction of the annular stator body, and which are at different distances in the radial direction from the center point of the annular stator body.

14. The resolver according to claim 13, wherein a first type of magnetic flux blocking portion, from among the plurality of types of magnetic flux blocking portions, is arranged such that, when the straight line intersects with the first type of magnetic flux blocking portion, the straight line passes between two of another type of magnetic flux blocking portions which are formed farther to the outside in the radial direction than the first type of magnetic flux blocking portion and which are adjacent to each other in the circumferential direction.

15. The resolver according to claim 13, wherein a first type of magnetic flux blocking portion, from among the plurality of types of magnetic flux blocking portions, is arranged such that, a circumferential position of a center portion in the circumferential direction of the first type of magnetic flux blocking portion matches a circumferential position between two of another type of magnetic flux blocking portions that are adjacent to one another in the circumferential direction.

16. The resolver according to claim 1, wherein the magnetic flux blocking portion comprises a plurality of types of magnetic flux blocking portions which are formed in a shape of long holes which extend in the circumferential direction of the annular stator body, and which are at different distances in the radial direction from the center point of the annular stator body.

17. The resolver according to claim 16, wherein a first type of magnetic flux blocking portion, from among the plurality of types of magnetic flux blocking portions, is arranged such that, when the straight line intersects with the first type of magnetic flux blocking portion, the straight line passes between two of another type of magnetic flux blocking portions which are formed farther to the outside in the radial direction than the first type of magnetic flux blocking portion and which are adjacent to each other in the circumferential direction.

18. The resolver according to claim 16, wherein a first type of magnetic flux blocking portion, from among the plurality of types of magnetic flux blocking portions, is arranged such that, a circumferential position of a center portion in the circumferential direction of the first type of magnetic flux blocking portion matches a circumferential position between two of another type of magnetic flux blocking portions that are adjacent to one another in the circumferential direction.

19. The resolver according to claim 1, wherein the magnetic flux blocking portion is formed on the annular stator body in positions radially outward from the plurality of teeth.

* * * * *